(12) United States Patent
Chiu et al.

(10) Patent No.: US 8,788,874 B2
(45) Date of Patent: Jul. 22, 2014

(54) CONTAINER SYSTEM AND MONITORING METHOD FOR CONTAINER SYSTEM

(75) Inventors: Kuo-Shu Chiu, Taipei (TW); Chien-Chou Chen, Taipei (TW); Szu-Hsien Lee, Taipei (TW); Hsing-Yi Chen, Taipei (TW)

(73) Assignee: Inventec Corporation, Taipei (TW)

( * ) Notice: Subject to any disclaimer, the term of this patent is extended or adjusted under 35 U.S.C. 154(b) by 362 days.

(21) Appl. No.: 13/435,292

(22) Filed: Mar. 30, 2012

(65) Prior Publication Data

US 2013/0159762 A1    Jun. 20, 2013

(30) Foreign Application Priority Data

Dec. 16, 2011 (TW) .............................. 100146916 A

(51) Int. Cl.
  *G06F 11/20* (2006.01)
(52) U.S. Cl.
  CPC .................................. *G06F 11/2033* (2013.01)
  USPC .............................. 714/4.11; 714/6.3; 714/10
(58) Field of Classification Search
  CPC . G06F 11/20; G06F 11/2023; G06F 11/2028; G06F 11/2033; G06F 11/2041
  USPC .................................................. 714/4.11, 6.3
  See application file for complete search history.

(56) References Cited

U.S. PATENT DOCUMENTS

| | | | |
|---|---|---|---|
| 7,826,216 B2 * | 11/2010 | Moss ....................... | 361/679.49 |
| 2004/0065106 A1 * | 4/2004 | Bash et al. ................... | 62/259.2 |
| 2004/0262409 A1 * | 12/2004 | Crippen et al. .............. | 236/49.3 |
| 2008/0313492 A1 * | 12/2008 | Hansen ............................ | 714/5 |
| 2009/0144568 A1 * | 6/2009 | Fung ............................ | 713/300 |
| 2009/0235104 A1 * | 9/2009 | Fung ............................ | 713/324 |
| 2009/0259713 A1 * | 10/2009 | Blumrich et al. ............. | 709/201 |
| 2009/0271539 A1 * | 10/2009 | Fujibayashi et al. ............ | 710/36 |
| 2009/0307703 A1 * | 12/2009 | Archer et al. .................. | 718/104 |
| 2011/0057803 A1 * | 3/2011 | Yamaoka et al. .............. | 340/584 |
| 2011/0119369 A1 * | 5/2011 | Banerjee ....................... | 709/224 |
| 2011/0267197 A1 * | 11/2011 | Archer et al. .................. | 340/584 |
| 2012/0215359 A1 * | 8/2012 | Michael et al. ............... | 700/275 |
| 2012/0221872 A1 * | 8/2012 | Artman et al. ................ | 713/320 |
| 2012/0303153 A1 * | 11/2012 | Gershenfeld et al. ......... | 700/198 |
| 2013/0159744 A1 * | 6/2013 | Gooding et al. .............. | 713/320 |

FOREIGN PATENT DOCUMENTS

| CN | 101344807 A | * | 1/2009 |
|---|---|---|---|
| CN | 201821366 U | * | 5/2011 |
| JP | 2011065444 A | * | 3/2011 |

* cited by examiner

*Primary Examiner* — Chae Ko
(74) *Attorney, Agent, or Firm* — CKC & Partners Co., Ltd.

(57) ABSTRACT

A container system and a monitoring method for the container system are provided. The container system includes a plurality of servers and a master server node. The servers are arranged in N areas. The master server node is coupled to the servers. The master server node selects one of a plurality of servers in an $i^{th}$ area to be a main node of the $i^{th}$ area. The main node collects temperature information of the servers in the $i^{th}$ area to transmit highest temperature information to the master server node. When the master server node cannot connect to the main node, the master server node selects one of other servers connected to the master server node in the $i^{th}$ area to be a replacing node, and adjusts the replacing node to be the main node of the $i^{th}$ area to collect the temperature information in the $i^{th}$ area continuously.

13 Claims, 2 Drawing Sheets

CONTAINER SYSTEM AND MONITORING METHOD FOR CONTAINER SYSTEM

CROSS-REFERENCE TO RELATED APPLICATION

This application claims the priority benefit of Taiwan application serial no. 100146916, filed Dec. 16, 2011. The entirety of the above-mentioned patent application is hereby incorporated by reference herein and made a part of this specification.

BACKGROUND OF THE INVENTION

1. Field of the Invention

The present invention generally relates to server monitoring technology, in particular, to a container system for collecting and monitoring temperature information of a plurality of servers and a monitoring method for the container system.

2. Description of Related Art

To cater to powerful operational performance in the field of cloud computing technologies and network applications, manufacturers integrate a plurality of servers into rack apparatuses that can be managed in a centralized way, and integrate the rack apparatuses into a container system. The container system herein may also be referred to as a container computer. The container system can monitor environmental factors such as heat dissipation and power supply of the servers in a unified way, so as to save operating costs.

In a motherboard of each server, temperature sensors are usually disposed at locations of important elements or in specific areas. The temperature sensors can detect surface temperatures of the elements or an environmental temperature in the server, in order to generate corresponding temperature information, so that the server itself can determine whether the elements (such as a central processing unit (CPU) and a chipset) are overheated or whether the environmental temperature is too high.

In particular, the container system collects and determines temperature data associated with a specific server or a specific computer first. The specific server or the specific computer may be referred to herein as a master server node. The master server node can control a corresponding controller to manage and control heat dissipation devices (for example, fan devices and water-cooling systems) in a unified way. Therefore, how to effectively collect and monitor the servers scattered in the container system and temperature data thereof in order to adjust the heat dissipation devices of the container system in real time is a problem for many manufacturers and thus requires a solution.

SUMMARY OF THE INVENTION

Accordingly, the present invention is directed to a container system and a monitoring method for the container system, in which the container system uses a hierarchical server structure to collect and monitor highest temperature information in each area, and which uses a replacing mechanism of the hierarchical server so as to overcome a defect that occurs when temperature information of an area cannot be reported continuously when a main node cannot be connected.

The present invention provides a container system, which includes a plurality of servers and a master server node. The servers are arranged in N areas, where N is a positive integer. The master server node is coupled to the servers. The master server node selects one of a plurality of servers in an $i^{th}$ area to be a main node of the $i^{th}$ area, where i is a positive integer and $1 \leq i \leq N$. The main node is used for collecting temperature information of the servers in the $i^{th}$ area and synthesizing the temperature information, so as to transmit highest temperature information to the master server node. When the master server node fails to connect to the main node, the master server node selects one of other servers connected to the master server node in the area to be a replacing node, and adjusts the replacing node to be the main node of the $i^{th}$ area to collect the temperature information in the $i^{th}$ area continuously.

In an embodiment of the present invention, the container system further includes N heat dissipation devices and a heat dissipation controller. The N heat dissipation devices are correspondingly arranged in the N areas, respectively. The heat dissipation controller is coupled to the master server node and the heat dissipation devices. The master server node transfers a heat dissipation control request to the heat dissipation controller according to highest temperature information respectively configured in the N areas, so as to adjust heat dissipation efficiencies of the N heat dissipation devices corresponding to the N areas.

In an embodiment of the present invention, the master server node reads a server address mapping table to resolve the servers arranged in the $i^{th}$ area, and sends a test request to the servers in the $i^{th}$ area in sequence to find servers capable of serving as the main node. Moreover, the master server node records the servers capable of serving as the main node in the server address mapping table.

In an embodiment of the present invention, when the master server node fails to connect to the main node, the master server node reads the server address mapping table so as to send the test request to the servers capable of serving as the main node in sequence. Moreover, the master server node sets one of servers returning a test response to be the replacing node.

From another perspective, the present invention provides a monitoring method for a container system. The container system includes a plurality of servers arranged in N areas, where N is a positive integer. The monitoring method includes the following steps. One of a plurality of servers in an $i^{th}$ area is resolved and selected to be a main node of the $i^{th}$ area. A report request is sent to the main node of each area in sequence, so that the main node collects a plurality of pieces of temperature information of the servers in the $i^{th}$ area, synthesizes the temperature information, and transmits a piece of highest temperature information. When the main node fails to be connected, one of other connected servers is selected in the $i^{th}$ area to be a replacing node, and the replacing node is adjusted to be the main node of the $i^{th}$ area to collect the temperature information in the $i^{th}$ area continuously.

Other implementation details of the monitoring method for a container system is apparent to one skilled in the art based upon the above description, and will not be described herein.

Based on the above, the master server node of the container system in the embodiment of the present invention selects a main node in servers of each area so as to use a hierarchical server structure to collect and monitor highest temperature information of the area. Moreover, when the main node cannot be connected to the master server node, a replacing mechanism of the hierarchical server is used, that is, the master server node may select another server connected to the master server node in the area to be a replacing node, and adjust the replacing node to be the main node. Thereby, temperature information can be reported continuously through the replacing node when the main node cannot be connected.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
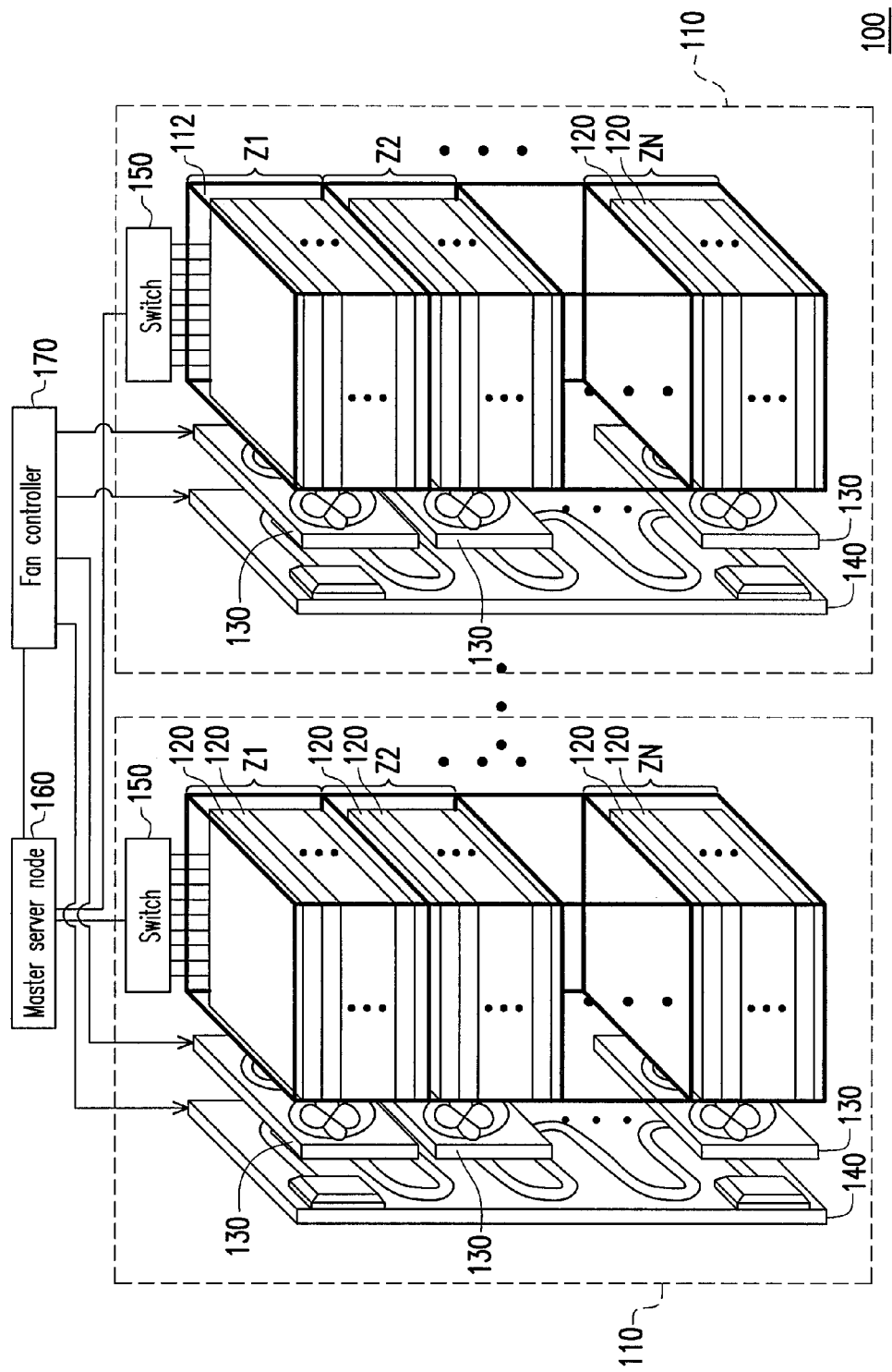
FIG. 1 is a schematic view of a container system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a container system 100 according to an embodiment of the present invention. The container system 100 may include a plurality of rack devices 110 and a master server node 160. The master server node 160 is, for example, a computer disposed independently outside the plurality of rack devices 110 or may be a server 120 located in the rack devices 110.

Each rack device 110 has a plurality of servers 120, a switch 150 conforming to Ethernet specifications, and a heat dissipation device. The servers 120 are arranged in N areas Z1-ZN, where N is a positive integer. In this embodiment, each server 120 includes a board management controller (BMC). The monitoring method disclosed in this embodiment is mainly performed by the master server node 160 using a service engine for executing software and the BMCs of the servers 120, but the present invention is not limited thereto. In other embodiments, the present invention may also be implemented by the master server node 160 and other elements in the servers 120, for example, implemented with the master server node 160 and CPUs in the servers 120 by executing application programs of functions described in the embodiment of the present invention.

The container system 100 further includes a heat dissipation controller, for example, a fan controller 170. The fan controller 170 is coupled to the master server node 160 and the heat dissipation devices in the rack devices 110. The heat dissipation device in each rack device 110 includes N fan devices 130 and a water-cooling device 140. Each fan device 130 and the water-cooling device 140 are respectively arranged in the corresponding areas Z1-ZN. In addition, the master server node 160 in this embodiment is coupled to the servers 120 in the areas Z1-ZN in the form of a wired network through an Ethernet and the switches 150.

Therefore, to maintain normal operation of the servers 120 in the container system 100 at a suitable environmental temperature and to achieve the efficacy of saving energy, the master server node 160 needs to poll the BMC of each server 120 continuously to collect temperature information of each server 120, so as to adjust the heat dissipation devices in real time, thereby strengthening/weakening environmental heat dissipation. For example, the rotation speed of the fan device 130 is increased/decreased in real time to adjust the environmental temperature of the corresponding area.

However, since each fan device 130 can blow air to the corresponding entire area, for example, an $i^{th}$ area Zi is taken as an example herein, where i is a positive integer and $1 \leq i \leq N$, highest temperature information detected by the BMC in the server 120 in the $i^{th}$ area Zi only needs to be known, and it is unnecessary to poll the BMC of each server 120.

Thereby, the master server node 160 in the embodiment of the present invention selects a server 120 from a plurality of servers 120 of each area and uses it as a main node, so as to form a hierarchical server structure. The function lies in that, the BMC of the main node can be used for collecting temperature information of all servers 120 in the $i^{th}$ area Zi, synthesizing the temperature information to obtain highest temperature information in the area Zi, and transmitting the highest temperature information to the master server node 160. The master server node 160 generates a heat dissipation control request respectively according to respective highest temperature information of each area, and transfers the heat dissipation control request to the fan controller 170, so as to adjust heat dissipation efficiencies of N heat dissipation devices corresponding to the N areas, for example, adjust the rotation speed of each fan device 130, a water inlet temperature, a water inlet pressure, a water valve switch, and so on of the water-cooling device 140.

Since the master server node 160 only needs to poll the main node in each area to obtain the highest temperature information of each area, requirements for the operational performance of the master server node 160 can be greatly lowered. Moreover, the master server node 160 can control the heat dissipation device of each rack device 110 accurately through the fan controller 170.

It should be particularly noted that, when the main node cannot report temperature information of the area Zi to the master server node 160 due to some reasons, for example, the chip or circuit of the BMC of the main node is damaged or the network Internet Protocol (IP) is changed, so that network connection fails, or the chip of the BMC of the main node is disconnected from the service engine of the master server node 160, the master server node 160 cannot know the temperature information of the area Zi and can only make the fan device 130 corresponding to the area Zi run at full speed. In this way, normal noise, oversupply of power, and continuous wear-out of the fan are caused, the relevant mechanism of the hierarchical server structure is also of little value, and the service engine of the master server node 160 may even become a useless program degrading the system performance.

Therefore, the spirit of the embodiment of the present invention lies in: collecting and monitoring the highest temperature information in each area based on the hierarchical server structure and performing a replacing mechanism between the servers 120 in each area to replace a main node that cannot be connected by a server that can be connected. Thereby, when the temperature information of the area cannot be reported when the main node cannot be connected is overcome through employment of a replacing node.

In other words, when the master server node 160 cannot connect to the main node of the $i^{th}$ area Zi, the master server node 160 detects and selects other servers 120 currently capable of being connected to the master server node 160 in the $i^{th}$ area Zi, and selects one of the servers 120 to be a replacing node. Moreover, the master server node 160 designates the replacing node to be the main node of the area Zi, so that the replacing node can collect temperature information in the $i^{th}$ area Zi continuously and the master server node 160 does not need to poll the old main node.

Figure 2:
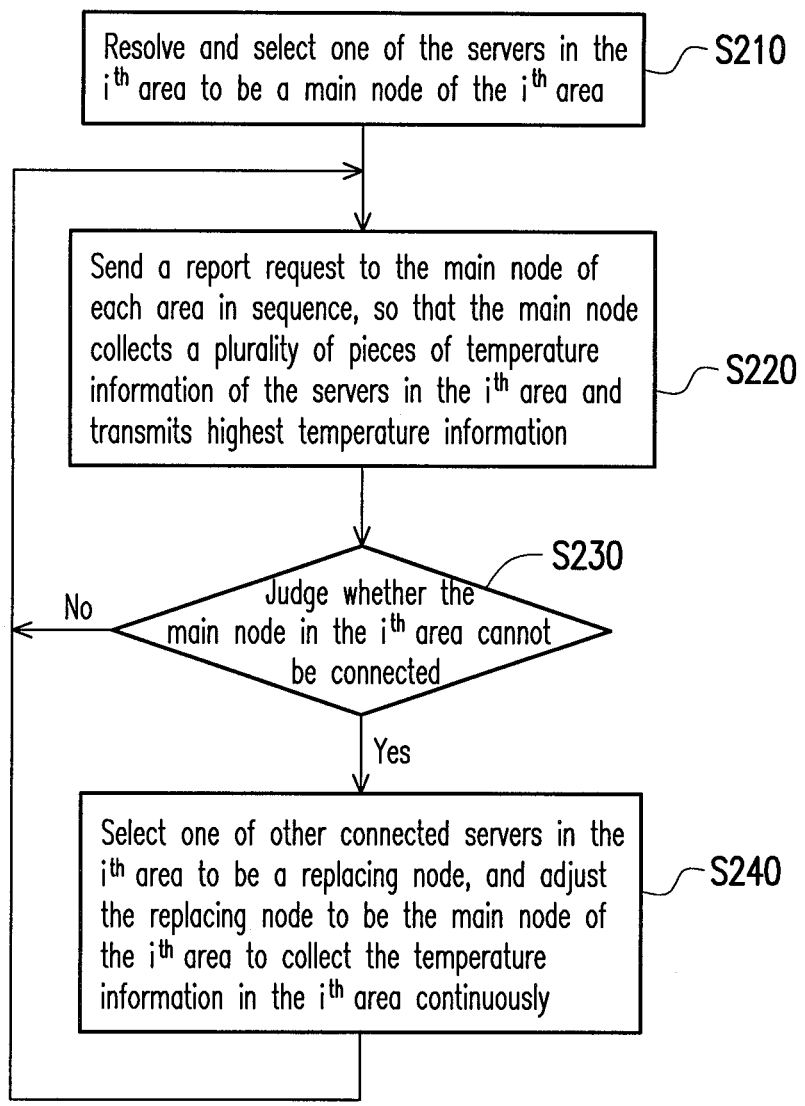
FIG. 2 is a flow chart of a monitoring method for a container system according to an embodiment of the present invention.

FIG. 2 is a flow chart of a monitoring method for the container system 100 according to an embodiment of the present invention. This monitoring method is applicable to the container system 100 shown in FIG. 1, so some of the implementation regarding the container system 100 can be seen in the above description, and will not be described herein again. Referring to FIG. 1 and FIG. 2, in Step S210, the master server node 160 resolves and selects a server 120 in the area Zi to be a main node of the area Zi.

Step S210 is described in detail herein. In this embodiment, the master server node reads a server address mapping table to resolve servers arranged in each area. The server address mapping table includes labels of each rack device 110 and each area Z1-ZN and corresponding IP addresses. Therefore, the master server node 160 can resolve, through the server address mapping table, the network address of each server in each area, the actual location of each server in each area in the container system 100, and the corresponding heat dissipation device of each area. In addition, the server address mapping table may also include a main node field for recording which server in each area is the main node.

Moreover, the master server node 160 sends a test request to the servers in the area Zi to find servers 120 capable of serving as the main node. Not every server 120 supports the monitoring method according to the embodiment of the present invention, and some servers 120 with a large amount of operation may be not used and do not need to serve as the main node in the embodiment of the present invention. Therefore, the master server node 160 regards servers 120 returning a test response as servers capable of serving as the main node by sending a test request, and records the servers in the server address mapping table for later use. Afterwards, the master server node 160 in this embodiment selects, according to the sequence of the servers listed for the area Zi in the server address mapping table, the first server 120 capable of returning the test response for the area Zi in the table to be the main node in the area Zi.

Then, in Step S220, the master server node 160 sends a report request to the main node of each area in sequence, so that the main node is awakened, and begins to collect temperature information of the servers 120 in the $i^{th}$ area Zi, to synthesize the temperature information to obtain highest temperature information, and to transmit the highest temperature information to the master server node 160.

In this embodiment, Step S230 may be performed in Step S220. In other words, while the master server node 160 polls the main node of each area and sends a report request to the main node of each area to obtain the highest temperature information of each area, the master server node 160 may further judge whether the main node in the area Zi cannot be connected. If the situation that the main node cannot be connected is not found in Step S230, Step S220 is performed continuously to maintain the environmental temperature of each server 120.

It should be particularly noted that, in Step S230 of this embodiment, the step in which the master server node 160 judges whether it can connect to the main node will be described as follows. When the master server node 160 sends the report request to the main node of the area Zi in polling, but the number of times that the master server node 160 does not receive the highest temperature information returned by the main node exceeds a disconnection preset value, the master server node 160 judges the main node as failing to be connected.

In other words, if the master server node 160 does not receive the highest temperature information returned by the main node (the situation is referred to as a return error in this embodiment), the master server node 160 changes the count of the area from "0" to "1", indicating that the return error occurs in the area once. Since the main node may be busy and thus does not return the highest temperature information to the master server node 160 to cause timeout, the occurrence of the return error within a predetermined number of times should be allowed. Therefore, if before the number of times of the return error accumulates to the disconnection preset value, for example, the number of times of the return error accumulates to 1 or 2, the master server node 160 still receives the highest temperature information returned by the main node, it indicates that the main node still can be connected to the master server node 160.

However, if the number of times of the return error accumulates to the disconnection preset value (for example, the number of times of the return error accumulates to 3), it indicates that the BMC of the main node may be disconnected due to network disconnection, IP setting error, server overload, or other reasons. Therefore, the master server node 160 judges the main node in the area Zi as failing to be connected, and the process proceeds from Step S230 to Step S240.

That's take another embodiment of Step S230 for example, the master server node 160 uses the time period instead of the number of times for judging whether it can connect to the main node. In detail descriptions, when the master server node 160 sends the report request to the main node of the area Zi at first time, but the time period that the master server node 160 does not receive the highest temperature information returned by the main node exceeds a disconnection preset period, the master server node 160 judges the main node as failing to be connected.

In other words, if the master server node 160 does not receive the highest temperature information returned by the main node yet, the master server node 160 counts the time period that the master server node 160 does not receive the returned highest temperature information (referred as a time period of return error) by timer or other devices. If the time period of return error accumulates to the disconnection preset period (for example, the time period of the return error accumulates to 30 seconds), it indicates that the BMC of the main node may be disconnected due to network disconnection, IP setting error, server overload, or other reasons. Therefore, the master server node 160 judges the main node in the area Zi as failing to be connected, and the process proceeds from Step S230 to Step S240.

When it is known through the judgment in Step S230 that the master server node 160 cannot connect to the main node, the process proceeds to Step S240, in which the master server node 160 detects other servers capable of being connected to the master server node 160 in the area Zi and selects one of the servers to be a replacing node. Afterwards, the master server node 160 adjusts the replacing node to be the main node of the area Zi to collect the temperature information in the area Zi continuously, and no longer polls the old main node.

Step S240 is described in detail herein. In this embodiment, when the master server node 160 cannot connect to the main node, the master server node 160 reads the server address mapping table in Step S210 and sends the test request to the servers 120 capable of serving as the main node in sequence. Afterwards, the master server node 120 selects, according to the sequence of the servers listed for the area Zi in the server address mapping table, the second server 120 for the area Zi in the table that can return the test response and can be connected to the master server node 120, and sets the server 120 to be a replacing node.

Then, the master server node 120 modifies the main node field in the server address mapping table, removes the old main node field, and marks a main node field corresponding to the replacing node to adjust the replacing node to be the main node of the area Zi. Thereby, returning to Step S220, the master server node 120 can collect, monitor, and adjust environmental temperature of each server 120 in the container system 100 according to the main node recorded in the server address mapping table.

To sum up, the master server node 160 of the container system 100 in the embodiment of the present invention selects a main node in servers of each area so as to use a hierarchical server structure to collect and monitor highest temperature information of the area. Moreover, when the main node cannot be connected to the master server node 160, a replacing mechanism of the hierarchical server is used, that is, the master server node 160 selects another server that can be connected to the master server node 160 in the area to be a replacing node, and adjusts the replacing node to be the main node. Thereby, the master server node 160 can report temperature information of the area continuously through the replacing node when the main node cannot be connected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A container system, comprising:
a plurality of servers, arranged in N areas, where N is a positive integer; and
a master server node, coupled to the servers, wherein the master server node selects one of the servers in an $i^{th}$ area to be a main node of the $i^{th}$ area, and the main node collects a plurality of pieces of temperature information of the servers in the $i^{th}$ area and transmits a piece of highest temperature information to the master server node, where i is a positive integer and $1 \leq i \leq N$,
wherein when the master server node fails to connect to the main node, the master server node selects one of other servers connected to the master server node in the $i^{th}$ area to be a replacing node, and designates the replacing node to be the main node of the $i^{th}$ area to collect the temperature information in the $i^{th}$ area continuously.

2. The container system according to claim 1, wherein the master server node is coupled to the servers through an Ethernet and a plurality of switches.

3. The container system according to claim 1, further comprising:
N heat dissipation devices, correspondingly arranged in the N areas, respectively; and
a heat dissipation controller, coupled to the master server node and the heat dissipation devices, wherein the master server node transfers a heat dissipation control request to the heat dissipation controller according to the respective highest temperature information of the N areas, so as to adjust heat dissipation efficiencies of the N heat dissipation devices corresponding to the N areas.

4. The container system according to claim 1, wherein the master server node reads a server address mapping table to resolve the servers arranged in the $i^{th}$ area, sends a test request to the servers in the $i^{th}$ area in sequence to find servers capable of serving as the main node, and records the servers capable of serving as the main node in the server address mapping table.

5. The container system according to claim 4, wherein when the master server node fails to connect to the main node, the master server node reads the server address mapping table, sends the test request to the servers capable of serving as the main node in sequence, and sets one of servers returning a test response to be the replacing node.

6. The container system according to claim 1, wherein the master server node sends a report request to the main node of each area in sequence, so that the main node collects a plurality of pieces of temperature information of the servers in the $i^{th}$ area and transmits the highest temperature information, and the master server node judges the main node as failing to be connected when the report request is sent to the main node, but the number of times that the highest temperature information returned by the main node is not received exceeds a disconnection preset value.

7. The container system according to claim 1, wherein the master server node sends a report request to the main node of each area in sequence, so that the main node collects a plurality of pieces of temperature information of the servers in the $i^{th}$ area and transmits the highest temperature information, and the master server node judges the main node as failing to be connected when the report request is sent to the main node, but the time period that the highest temperature information returned by the main node is not received exceeds a disconnection preset period.

8. A monitoring method for a container system, wherein the container system comprises a plurality of servers arranged in N areas, where N is a positive integer, the monitoring method comprising:
resolving and selecting one of the servers in an $i^{th}$ area to be a main node of the $i^{th}$ area;
sending a report request to the main node of each area in sequence, so that the main node collects a plurality of pieces of temperature information of the servers in the $i^{th}$ area and transmits a piece of highest temperature information; and
when the main node fails to be connected, selecting one of other connected servers in the $i^{th}$ area to be a replacing node, and adjusting the replacing node to be the main node of the $i^{th}$ area to collect the temperature information in the $i^{th}$ area continuously.

9. The monitoring method according to claim 8, wherein the step of resolving and selecting one of the servers in the $i^{th}$ area to be the main node of the $i^{th}$ area comprises:
reading a server address mapping table to resolve the servers arranged in the $i^{th}$ area; and
sending a test request to the servers in the $i^{th}$ area in sequence to find servers capable of serving as the main node, and recording the servers capable of serving as the main node in the server address mapping table.

10. The monitoring method according to claim 8, wherein the step of resolving and selecting one of the servers in the $i^{th}$ area to be the main node of the $i^{th}$ area further comprises:
setting one of servers returning a test response to be the main node.

11. The monitoring method according to claim 9, wherein the step of selecting one of the other connected servers in the $i^{th}$ area to be the replacing node comprises:
reading the server address mapping table, and sending the test request to the servers capable of serving as the main node in sequence; and
setting one of servers returning a test response to be the replacing node.

12. The monitoring method according to claim 8, wherein the step of judging that the main node fails to be connected comprises:
judging the main node as failing to be connected when the report request is sent to the main node, but the number of times that the highest temperature information returned by the main node is not received exceeds a disconnection preset value.

13. The monitoring method according to claim 8, wherein the step of judging that the main node fails to be connected comprises:

judging the main node as failing to be connected when the report request is sent to the main node, but the time period that the highest temperature information returned by the main node is not received exceeds a disconnection preset period.

\* \* \* \* \*